Patented June 24, 1930

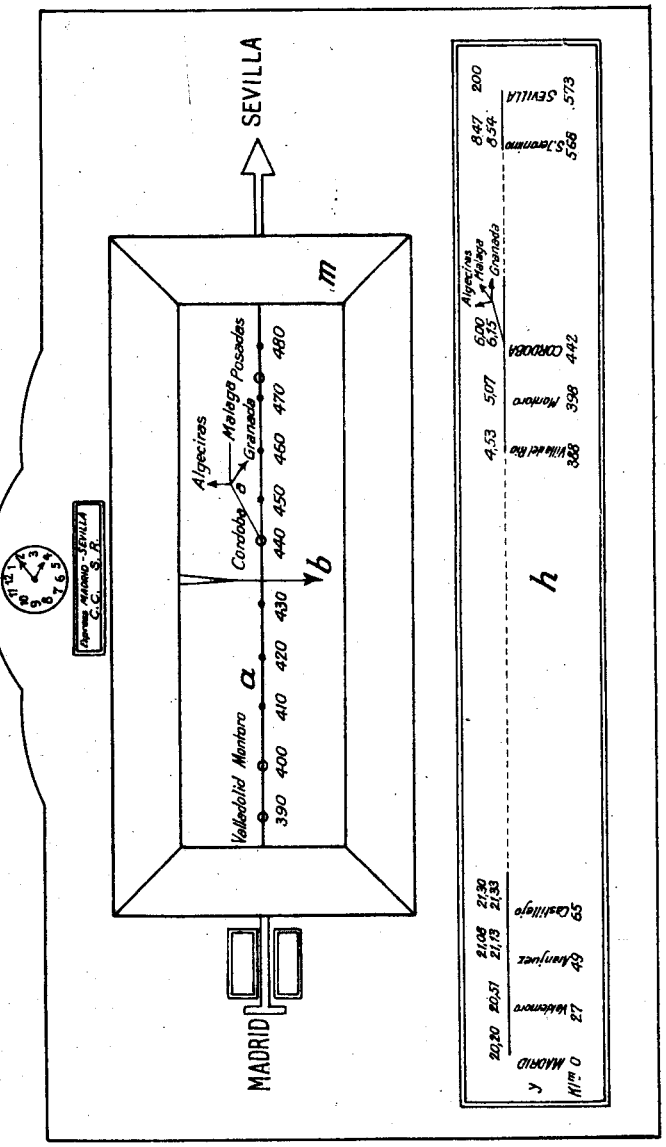

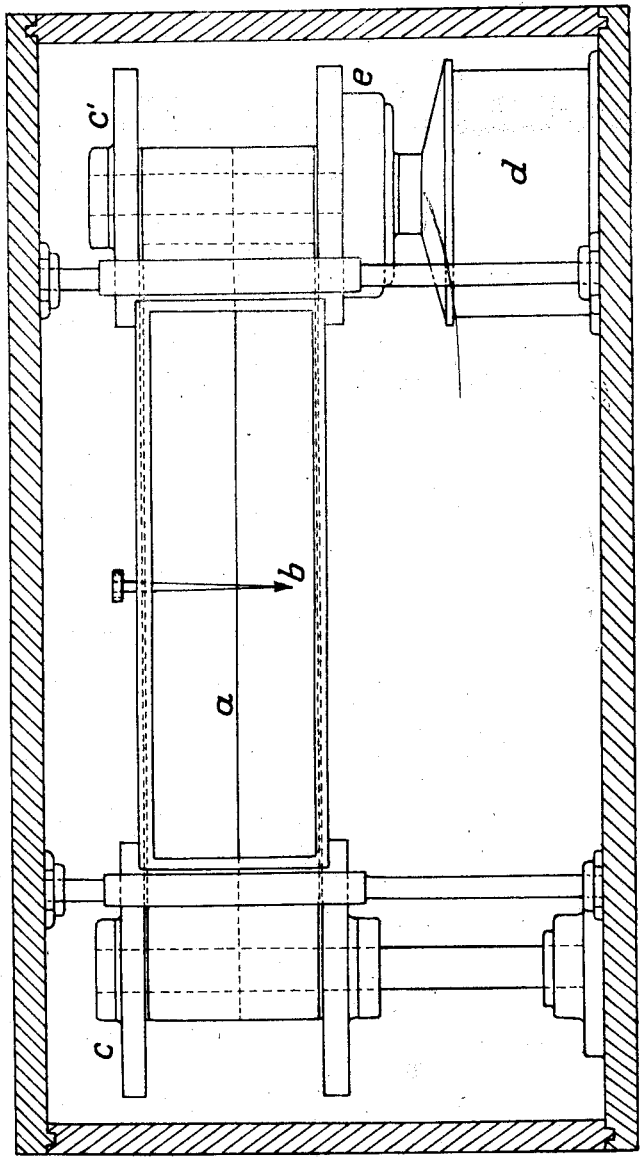

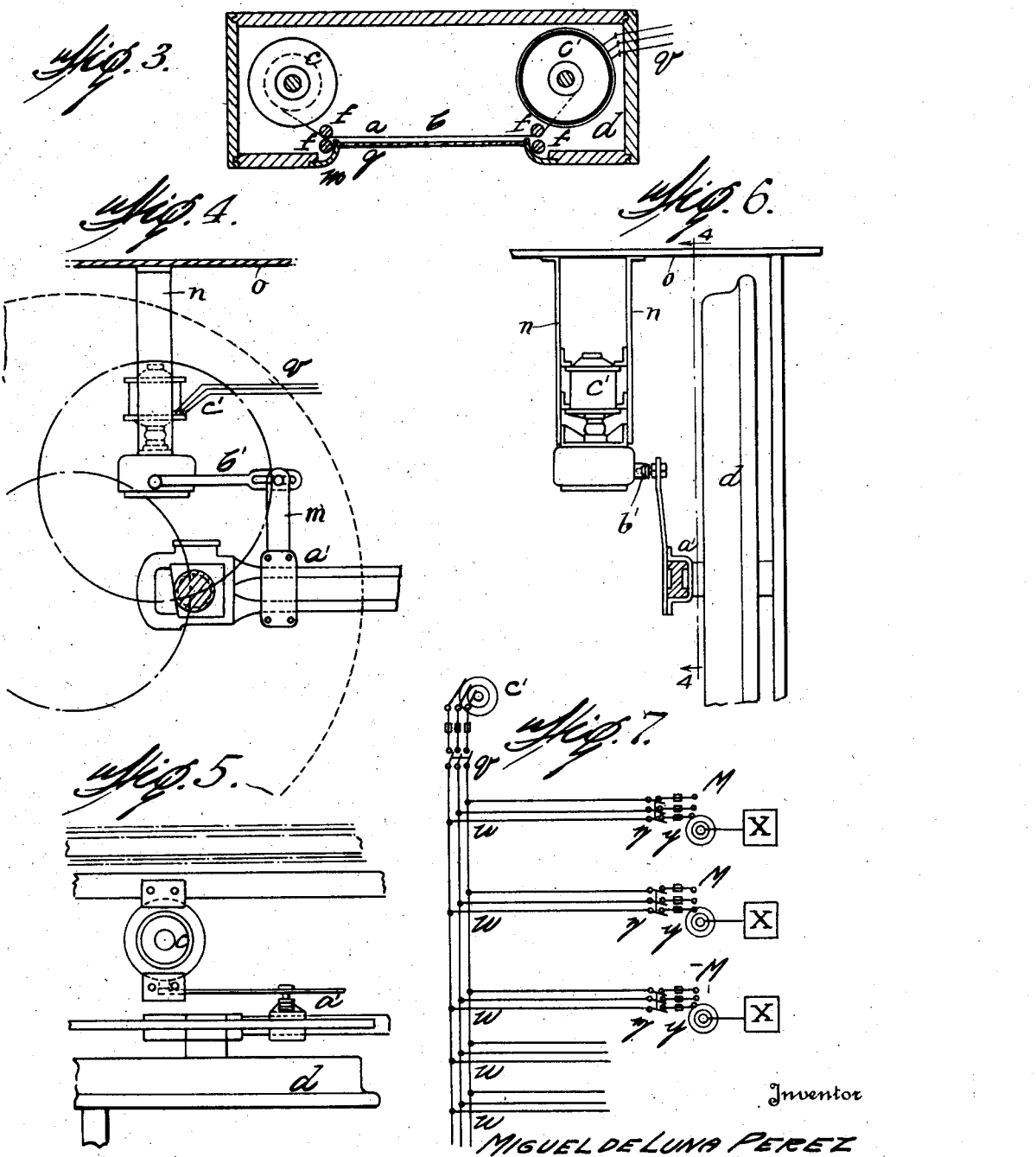

1,768,235

UNITED STATES PATENT OFFICE

MIGUEL DE LUNA PEREZ, OF BARCELONA, SPAIN

STATION AND ROUTE INDICATOR FOR RAILWAY TRAINS, TRAMS, AND OTHER FIXED ROUTE VEHICLES

Application filed October 14, 1926, Serial No. 141,630, and in Spain October 28, 1925.

The subject of the present invention is an apparatus intended to indicate to travellers, even in the interior of the carriage, and at any moment and in all circumstances, the exact place reached by the vehicle as well as particulars relating to the itinerary.

According to the invention mechanism is used which consists essentially in means adapted to take up or integrate the movements of a vehicle over the route taken by the vehicle from its point of departure and to transmit them to an apparatus which, in synchronism with the said movements presents on a reduced scale the chart of the route in front of an indicator which points out the exact position of the vehicle at any moment.

The chart is illustrated with any annotations which may be thought useful in each case, such as distance in furlongs, miles, number of stations, times of stoppage, changing of trains, etc., and the chart may be inscribed upon a sphere, cylinder, band or tape, or may be presented in any other appropriate form.

The accompanying drawing represents, by way of example, one constructional form of apparatus according to the invention.

Figure 1 is a front elevation of the indicator.

Figure 2 is a front sectional view.

Figure 3 is a horizontal sectional view.

Figure 4 is a section on line 4—4 of Figure 6 looking in the direction of the arrows.

Figure 5 is a plan of the same.

Figure 6 is a front elevation of the same.

Figure 7 is a wiring diagram.

Referring more particularly to Figures 1, 2 and 3 $a$ represents a movable route band or tape. $b$ is the fixed indicating needle. $c$ and $c'$ are the rollers for the route band or tape. $d$ is an electric motor for operating the indicator mechanism. $e$ is a train of gears. $f$ are guide rollers for the route band. $g$ is a glass protector. $h$ is a stationary timetable and distance indicator. $m$ is the frame of the indicator window.

Referring to Figures 4, 5 and 6, $a'$ indicates the connecting rod or coupling rod of the vehicle. Securely positioned on and carried by this rod is an arm $m$ to which is attached a crank $b'$ for transmitting motion to a generator. The electric generator $c'$ is supported by braces $n$ which are secured to the vehicle frame $o$.

The transmission mechanism of the apparatus according to the invention is shown in Figures 4, 5 and 6 of the drawings. It comprises an arrangement of axles, cranks or connecting rods and wheels and pinions which transmit the movement of the connecting rod $a'$ of a locomotive or analogous machine, to a small electric generator $c'$, by means of a small crank $b'$. The characteristics of the generator will be of course in constant relation to the route followed by the vehicle.

The electric current generated is transmitted by a main lead which passes to all the points required on the train and at which the main lead is connected to the indicating apparatuses, which may be of any desired number.

Preferably, this mechanism will be of the general form indicated in Figures 4 and 5. In addition to this mechanism which may be referred to as the "transmitter", it is necessary to use the indicating apparatus, which among other forms, may be constructed in the manner represented by Figures 1, 2 and 3.

This indicating apparatus is formed by a small electric motor $d$ synchronized with the generator and according to the travel of the vehicle transmits the movement by the intermediary of the train of small wheels $e$ to a pair of drums which respectively wind and unwind a travelling route band or tape $a$ upon which is marked the route of the train with all desired indications.

The band $a$ may be adapted to be read by direct vision or as a transparency with internal lighting. It may also carry, in conveniently chosen points, contacts disposed in such a way that they engage with other fixed contacts so as to sound a signal. In a general way, the band $a$ may be combined with any arrangement enabling the travellers, without leaving the carriage, to have on view any indications which may be useful.

The transmitting apparatus described may be mounted upon any suitable moving part of the locomotive or traction vehicle, or a drawn vehicle; and it may vary in form and arrangement according to the kind of vehicle to which it is applied and to suit particular constructive requirements which may be encountered, for instance the type of electric generator used, and it may be made to transmit its movement to the indicator by flexible or any other mechanical means of transmitting movement rendering the employment of a small electric motor unnecessary.

In Figures 1, 2 and 3 a framed and fixed indicator is shown in addition to the travelling band or tape 11, giving all the journey distances. It is to be understood that the form and details of construction of the indicator and transmitting device may be modified considerably without departing from the spirit of the invention.

Having now fully described and ascertained the nature of my invention what I claim and in respect of which I desire to secure Letters Patent is:

A vehicle route and like indicating apparatus designed particularly for passenger trains, comprising a casing adapted to be removably supported in the cars of the train, a fixed pointer visibly mounted on the casing, rollers supported in the casing, a tape wound on the respective rollers and extending across an opening in the casing so as to be visible together with the pointer, the tape bearing surface indications of the route over which the train is traveling, a motor arranged in the casing on the shaft of one of the rollers, a current generator in circuit with the motor, the said generator being driven by a crank arm from the driving rod of the locomotive, the said generator being thereby synchronized with the driving wheels and also with the motor, whereby the tape controlled by the motor is moved in synchronism with the wheels of the locomotive.

In testimony whereof I have signed my name to this specification.

MIGUEL DE LUNA PEREZ.